June 28, 1966     E. WEISSE     3,257,777
PROCESS FOR TREATING WASTE GASES
Filed Jan. 25, 1962     5 Sheets-Sheet 1
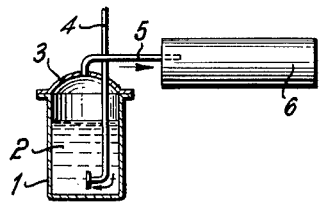
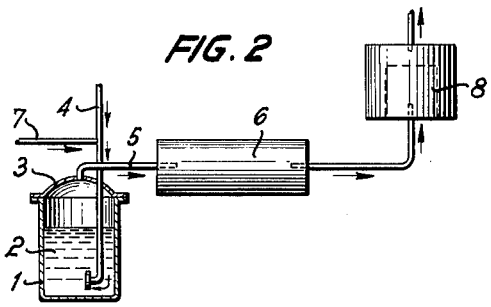
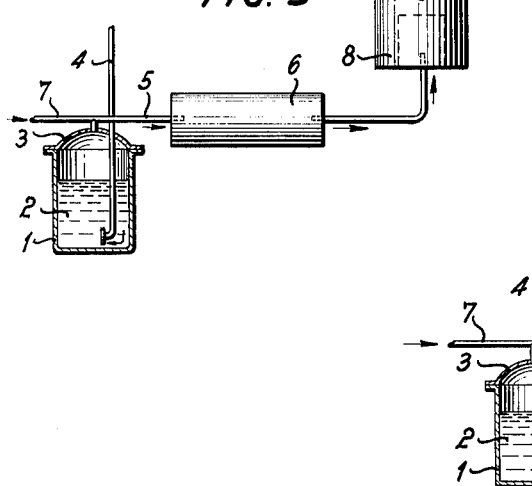
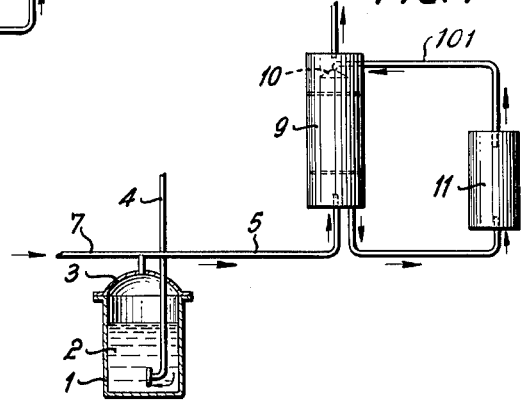
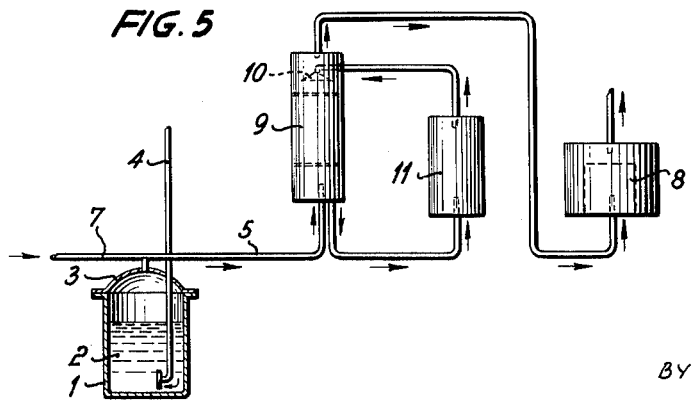
INVENTOR
ERNST WEISSE
BY
McGlew and Toren
ATTORNEYS

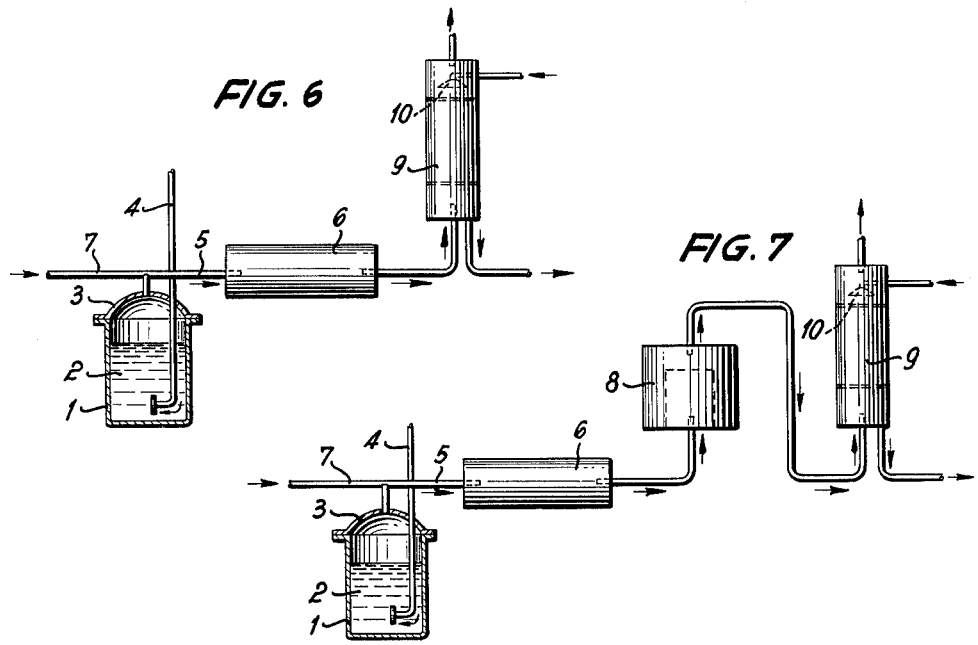
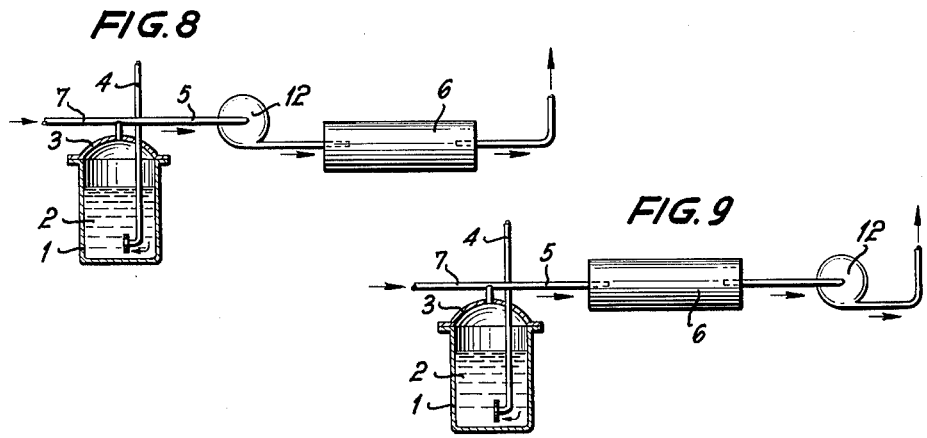
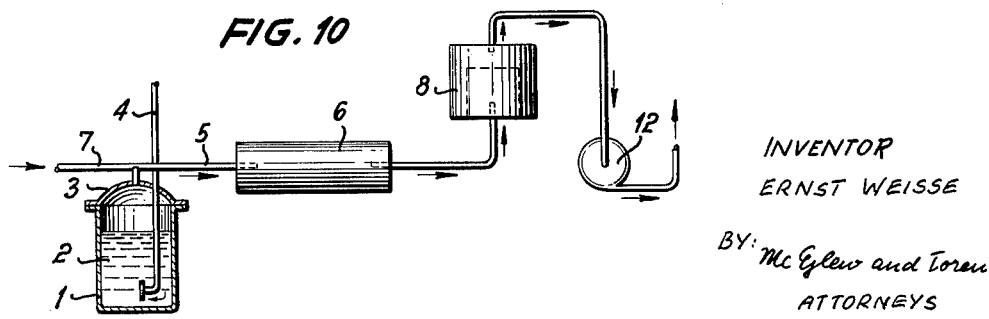

INVENTOR
ERNST WEISSE
BY:
McGlew and Toren
ATTORNEYS

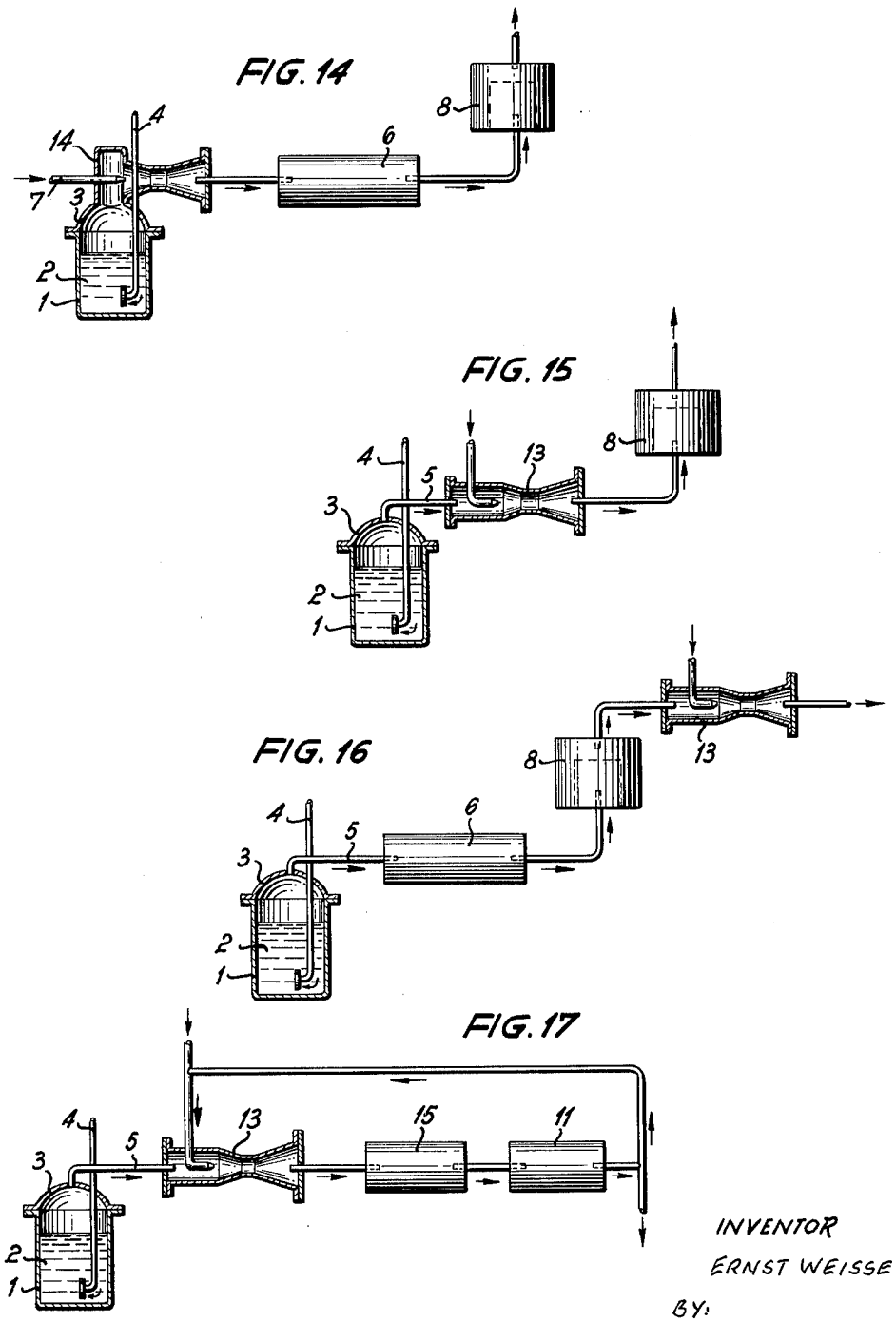

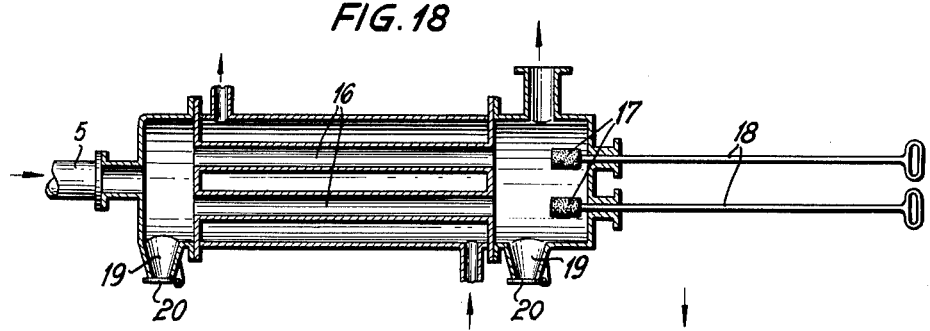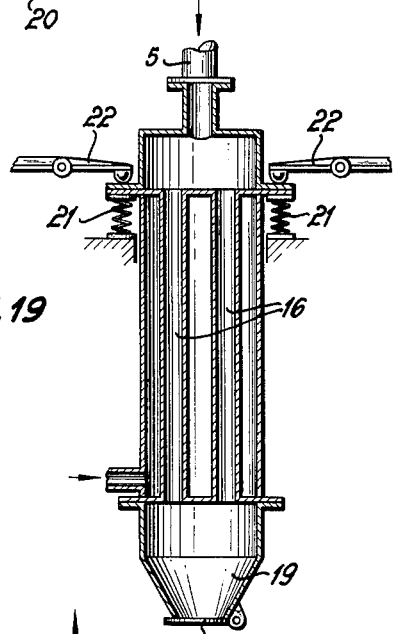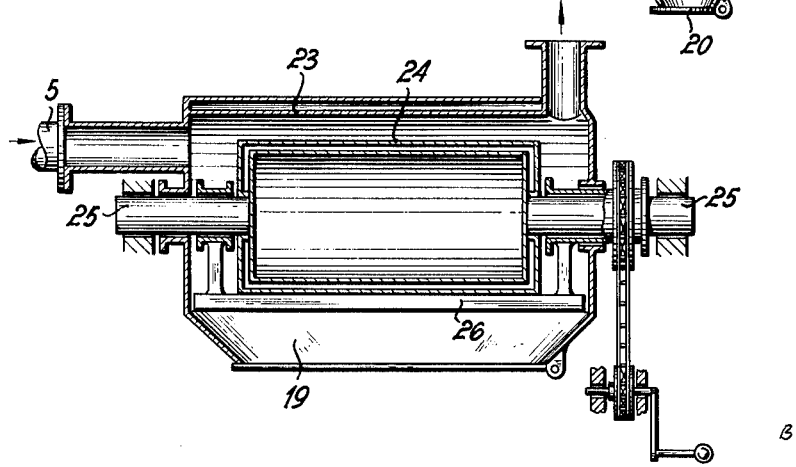

United States Patent Office 3,257,777
Patented June 28, 1966

3,257,777
PROCESS FOR TREATING WASTE GASES
Ernst Weisse, Hannover, Germany, assignor to Demag-Elektrometallurgie G.m.b.H., Duisburg, Germany
Filed Jan. 25, 1962, Ser. No. 168,842
Claims priority, application Germany, Jan. 31, 1961,
W 29,368
3 Claims. (Cl. 55—82)

My invention generally relates to metal refining and is particularly directed to a method for removing harmful and/or undesirable components from waste gases exiting from the surface of a molten metal bath.

The term "waste gases" as used by me in this application is deemed to refer to any kind of gaseous mixture or gas flow which rises from the surface of a metal bath or melt.

It is, of course, well known in the art to subject a molten metal charge for refining purposes to the action of a gas flow. Thus, for example, in the refining of steel the molten charge is blown with air or oxygen which is injected into the bath. Again, copper melts are usually treated with air, while in the manufacture of aluminum, the molten aluminum charge is treated with chlorine or chlorine yielding compounds. The gas treatment of the molten metal may serve different purposes. Thus, in some instances the gas flow accomplishes a purification effect as it removes other gases such as, for example, hydrogen which may be dissolved or entrapped in the molten metal. The dissolved undesired gas is removed by the purifying gas flow as the partial pressure of the dissolved gas is lower in the gas flow than in the molten metal so that the dissolved gases diffuse into the rising bubbles of the purifying gas flow and escape from the surface of the melt together with the gas flow. In other instances, undesired or harmful constituents, hereinafter referred to as "contaminants," form new compounds with the gas passed through the melt which new compounds either no longer exert a disturbing influence or escape together with the gas flow.

Further, in some instances, contaminants are suspended within the melt structure and the gas flow rising through the melt exerts then a flotation effect on these contaminants whereby the contaminants are carried to the surface of the melt from where they can be readily removed.

Irrespective of the purpose for which the gas treatment has been initially employed, the waste gas flow exiting from the surface of the melt comprises a considerable amount of contaminants which may be in gaseous, vaporous or suspended solid particle form. The solid particles are usually very small and will hereinafter be referred to as "dust" or "dust particles." If the contaminant-containing waste gases are directly discharged through a chimney or the like of the refining plant, the surrounding areas may be endangered as in many instances the contaminants are toxic and/or corrosive. Such waste gases may thus imperil the health of the plant personnel or persons living in the neighborhood of the plant. Furthermore, in the event that the waste gases contain chemically aggressive contaminants, the discharge lines and chimneys are subjected to considerable wear and tear. This is particularly the case if the waste gases contain chlorine. Thus, for example, in the refining of aluminum, the waste gases practically without exception are rich in chlorine. If the chlorine-containing waste gases come into contact with moisture-containing air, free hydrochloric acid is formed which attacks many of the customary structural materials.

Accordingly, it is a primary object of my invention to overcome the disadvantages referred to and to provide a method for effectively removing contaminants from waste gases before the waste gases are discharged into the ambient atmosphere.

Generally, it is an object of my invention to improve on metal refining processes, and particularly on waste gas processing methods as hitherto practiced.

Briefly, and in accordance with my invention, I conduct the waste gases rising from the melt away from the surface of the melt and cool the waste gases to a temperature below the condensation temperature of the vaporous contaminants to obtain these contaminants in solid form. The solids are then removed from the gas flow.

The waste gas flow which emanates from the melt has, of course, a temperature approximating that of the melt. As most metal refining processes are performed at temperatures between about 400 and 1400° C., the waste gas flow will thus generally have a temperature within that range. At such high temperatures, most of the contaminants are present in vaporform so that a cooling to a temperature below the condensation point of these contaminants will yield these contaminants in either liquid or solid form. In the majority of cases, the contaminants will be in solid form. In fact, I have established that in most instances the contaminants condense in the form of fine solid particles or dust which is carried along by the waste gas flow and which may be separated therefrom in mechanical manner.

As previously mentioned, some of the contaminants may originally be present in the waste gas flow in dust form, and therefore, after the condensation of the vaporous contaminants, the waste gas flow will contain not only the original dust particle contaminants, but also the condensed dust.

The separation of the dust from the waste gas flow may be accomplished in different manner. Thus, for example, the customary prior art dust separators may be employed as, for example, cyclones. However, electrically operated dust separators or even simple filter devices may also be used. If ordinary filters are employed, then, of course, care should be taken that the waste gas has been cooled to such an extent that the filter cloth or the like filtering means will not be heat-damaged by the gas.

In the event that the waste gas, after the separation of the dust particles, should still contain gaseous contaminants, then the waste gas may be passed through a wash tower or scrubber. The wash tower may be operated with a liquid which either chemically binds or dissolves the gaseous contaminants so that the purified waste gas thereafter may be discharged through a chimney or the like without endangering the surrounding areas.

Of course, if the waste gases do not contain gaseous contaminants, then the treatment in the wash tower or scrubber can be eliminated.

According to a preferred embodiment of my invention, the cooling of the waste gases is preferably performed in such a manner that the dust particles, after the cooling, can settle by gravity or by the use of adhesion forces. However, it will be realized that such gravity or adhesion separation requires relatively large cooling surfaces and is time consuming, and for this reason the settling of the dust may be accelerated, for example by electric dust separation.

The cooling proper of the waste gases may be accomplished in varying ways. According to one embodiment, the gas is simply passed through a heat exchanger which has large heat exchanging surfaces which may be constituted of pipes, tubes, cooling drums or the like.

However, according to a preferred embodiment of the invention, the cooling is at least partially accomplished by admixing the waste gas flow with a cooler carrier gas or liquid which preferably should be inert to the waste gas and its contaminants so as to avoid side reactions. The nature of the carrier gas will therefore be dependent on the composition of the waste gas. If a liquid is employed, it is, however, feasible to use a material which absorbs gaseous contaminants. The admixture of a carrier gas with the waste gas has several advantages. Firstly, the speed of the waste gas through the lines is, of course, accelerated and dust particles are more effectively advanced in the presence of a carrier gas admixture. The dust particles may then be simply separated from the gas flow in a mechanical filter.

Secondly, however, and most important, the carrier gas has a cooling action on the waste gas flow. In this connection it should be emphasized that the carrier gas usually will be added to the waste gas after the waste gas has been discharged from the melt surface. However, it is also possible to admix carrier gas to the waste gas before the original gases forming the waste gas flow enter the metal melt whereby, however, the cooling function of the carrier gas is lost.

The amount of carrier gas and its temperature are deciding factors concerning the cooling action of the carrier gas if it is admixed with the waste gas after the waste gas has been discharged from the metal surface. If considerable amounts of cold carrier gas are admixed, then the carrier gas can in fact entirely accomplish the desired cooling of the waste gas flow to a temperature value which is below the condensation point of the vaporous contaminants. In such an event, it will not be necessary to provide other heat exchanging or cooling means and the gas flow can then be directly conducted to a separator for separating the dust from the gas. If the separation of the dust particles is carried out in a filtering device, then again the amount of the carrier gas should be sufficient so as to lower the waste gas flow to a temperature value which no longer will affect the filter cloth.

Concerning the carrier gas which, for example, may be air or an inert gas such as nitrogen, it should be added that in most instances it is recommended to dry the carrier gas before it is admixed with the waste gas flow. This is so because many of the contaminants in the waste gas flow, particularly when they are in dust form, are hygroscopic and contact between moist air or the like moist carrier gas and hygroscopic dust particles will, of course, result in a sticky mass which will render the subsequent separation of the dust particles more difficult as these particles then tend to clog the filter device.

According to a further modification of my invention, the separate cooling and dust separating procedure may be replaced by passing the waste gas directly through a wash tower or scrubber. The scrubber should be operated in such a manner that the waste gas is not only cooled to the desired temperature value, that is below the condensation temperature of the contaminants, but that the settling out of the dust particles is accomplished. Particularly advantageous in this connection is to operate the scrubber with a liquid which not only accomplishes the cooling of the waste gas flow but which also dissolves or chemically binds any gaseous contaminants. However, it will be realized that from a practical point of view, the employment of a scrubber is not always possible, particularly if the waste gases contain highly aggressive and toxic contaminants as in that event the wash liquid may be difficult to dispose of.

It will be realized that for the purpose of effectively drawing off the waste gases from the surface of the metallic melt and for feeding the waste gas flow to the contaminant-removing stations, it is necessary that the waste gas flow has a sufficient feed pressure. If carrier gas is admixed with the waste gas flow above the surface of the melt, then the carrier gas admixture may impart to the waste gas sufficient momentum for this purpose. However, the required feed pressure can also be obtained by originally injecting the gas passing through the melt at an excess pressure value, i.e., at a pressure which is higher than would ordinarily be necessary for causing the flow of the gas through the melt. The actual feed pressure necessary for passing the waste gas flow through the purification plant is dependent on various factors such as the flow resistance offered by the conduits and the treatment units. From a practical point of view, the gas flow will have to be conducted in such a manner that sufficient pressure is available to make sure on the one hand that the gas passes in sufficient amounts at a desired speed through the metal melt, while on the other hand the exiting waste gas flow has sufficient momentum so as to pass through the various purification units at a desired velocity.

In calculating the feed pressure of the waste gas flow, it has also to be considered that the speed of the waste gas flow should be sufficient to carry along dust particles which originally are entrained in the gas flow and/or are formed upon cooling to the condensation point of the contaminants to a desired extent and do not settle out in premature manner. Thus, for example, it should be prevented that the dust particles settle in the lines or in the cooling units when it is intended to effect such separation in a separating unit. Another factor to be considered with regard to the feed speed of the waste gas flow is that in the event that a heat exchanger is utilized, a more efficient heat transfer will be accomplished when the speed of the gases through the unit is higher, whereby in turn the size of the heat exchanging areas may be reduced.

If carrier gas is admixed to the waste gas flow before the gases which finally form the waste gas flow are injected into the metal melt, then two principal factors will have to be considered. On the one hand, the quantity of carrier gas to be admixed will have to be carefully chosen so as not unduly to cool the metal melt. In other instances, by contrast, it may be desired to dissipate excess amount of heat in the melt and in such event, a large quantity of carrier gas will be desired.

The feed pressure of the waste gas flow may also be increased by injector means or the like devices which advance the flow of the waste gases through the plant. Further, it is feasible to combine an original excess pressure of the waste gas forming gases with injector means or the like.

I have established that the arrangement of flow advancing means, for example injector means, directly behind the space above the bath surface is particularly advantageous. This is so because if the injector or the like gas advancing means is arranged close to the bath surface, no significant cooling of the waste gases takes place due to heat radiated from the melt. Therefore, no significant condensation of contaminants takes place in the vicinity of the bath surface. By contrast, if the flow advancing means is spaced from the bath surface to a greater extent, the advancing means may be obstructed by condensing contaminants so that it might be necessary artificially to heat the flow advancing means or at least the lines leading thereto. In this connection it should also be mentioned that the operation of injectors causes considerable cooling of the expanding gases so that the injector openings may be blocked by frozen materials. By arranging the injector close to the bath surface, this disadvantage is obviated.

In a preferred embodiment of the invention, the flow advancing means comprise an injector which is operated with carrier gas. In this manner, the waste gas flow can be readily brought to the desired speed and the gases are, without difficulty, drawn away from the surface of the bath.

As previously mentioned, the amount of carrier gas which is admixed with the waste gas flow may be adjusted so that any additional cooling is superfluous as the carrier gas lowers the temperature of the waste gas flow to a sufficient extent. In this connection I should also state that the amount of carrier gas to be admixed with the waste gas is not alone the deciding factor concering the extent of the cooling. Rather, if the carrier gas is supplied to the waste gas through an injector, then the speed of the carrier gas in the nozzle of the injector will, of course, be accelerated at the expense of the original gas pressure, whereby the additional expansion of the carrier gas causes significant cooling of the carrier gas, thereby in turn reducing the temperature of the waste gas. Thus, to a certain extent, the cooling function of the carrier gas is dependent on the efficiency of the injector means.

According to a further modification, the injector means may be operated with a liquid. An excellent mixing of waste gas and liquid takes place in the diffusor of the injector, which may comprise a funnel for receiving the waste gas flow, a mixing chamber and an enlarged portion for converting a part of the speed of the gas flow into pressure. The quantity of liquid supplied to the injector should be chosen so that the heat emanating from the hot waste gases does not cause significant evaporation of the injector liquid. A liquid-operated injector is particularly advantageous if small dimensions are of importance, and can be employed as advantageously as a scrubber. In fact, an injector, considered from some points of view, is superior to a scrubber because due to the vacuum in the suction space of the injector, the waste gases are efficiently withdrawn from the bath surface without requiring superatmospheric pressure of the original gas flow passing through the melt.

However, I should mention that a liquid-operated injector has, of course, a disadvantage in the same manner as a scrubber, i.e. the liquid will be enriched with toxic or chemically aggressive contaminants which might be difficult to dispose of. In order to overcome this disadvantage, the injector liquid may be conducted in cyclic manner so that no toxic or corrosive waste liquors are discharged.

The flow advancing means may, of course, comprise blowers or fans instead of injector means. According to another modification, an injector may be combined with a fan or blower. If a fan or blower is used, then I prefer to employ a construction with a rotating fan wheel and, if desired, carrier gas may be admixed at the suction side of the fan. In that event, the amount of carrier gas should be adjusted so that the hot waste gases are cooled to a temperature at which the fan will operate without difficulty.

It will be realized that the structural materials of the flow advancing means should be resistant with regard to the waste gas contaminants and the waste gas flow proper. The same, of course, applies to the various conduits and treating units.

In carrying out the inventive procedure, it is important to make sure that the waste gas does not escape from the metal refining reactor, but is properly channeled toward the purification plant. For this purpose, the metal refining reactor should preferably have a tightly sealing cover while the waste gas flow enters an exit pipe which is either mounted in the cover or in the walls of the reaction vessel or reactor proper. If the plant is operated at a subatmospheric pressure, again care should be taken to avoid the entry of extraneous air from the outside. The entry of air from the outside is undesired because air generally contains a certain amount of moisture which, as previously mentioned, may have a deleterious effect on the dust particles in the waste gas flow. A tightly sealing cover or lid will usually be sufficient to prevent the entry of outside air. However, as the temperature within the reaction space is normally between 400 and 1400° C., specially constructed washers or gaskets may be necessary for sealing purposes. I have established that rubber washers which are positioned between water cooled bearing surfaces are particularly suitable. The rubber gaskets should be arranged so that they are not directly subjected to the radiating heat from the metal bath surface.

As is well known, gas treatment of molten metal may result both in exothermic and endothermic reactions. In the latter case, it may be necessary to arrange heating means on the reaction vessel so as to maintain the proper temperature. Such heating means may also be required when it is desired to vary the temperature of the bath during the refining procedure.

As previously mentioned, the cooling of the waste gas flow may, in some instances, be accomplished by the employment of a heat exchanger. In that event, it is advantageous to fit the heat exchanger with a cleaning device in order to remove the settled out dust particles from the exchanger surfaces. If the heat exchanger comprises a plurality of pipes, then it is most simple to use brushes which are mounted on sticks or rods whereby the dust particles can be readily removed from the heat exchanger space. Of course, the usual scraping devices may also be employed, particularly in drum coolers.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of my invention.

In the drawings:

FIGS. 1–17 show different embodiments of the inventive apparatus comprising various purification means in the form of cooling, filtering and scrubbing units which are arranged above a metal refining reactor for removing contaminants from the waste gas flow rising from the metal bath.

FIGS. 18–20 show three different embodiments of heat exchangers being fitted with cleaning devices for removing dust particles therefrom.

Figure 11:
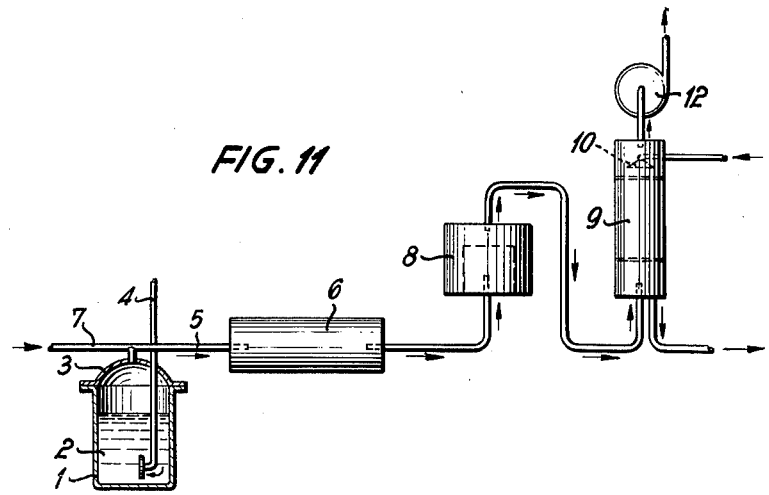

Referring now to the drawings wherein like reference numerals indicate identical parts in the different figures, it will be noted that in FIG. 1 reference numeral 1 indicates a reaction vessel or reactor as customarily used for the refining of metal such as steel, copper or aluminum. The reaction vessel 1 is tightly closed by a lid 3 while the metal melt proper has been indicated by reference numeral 2. The metal melt is treated with a gas such as, for example, air or chlorine which is injected into the interior of the melt through a pipe 4. Gas will thus bubble through the melt which exits from the reaction vessel 1, 3 in the form of a waste gas flow through the discharge pipe 5 which is mounted in the lid or cover 3. Reference numeral 6 indicates a heat exchanger of ordinary construction in which the waste gas flow exiting through pipe 5 is cooled to a temperature below the condensation temperature of the vaporous contaminants in the waste gas. As schematically indicated at the lower end of line 4, the gas injected into the melt is distributed by nozzles or the like distributing means.

As previously mentioned, the waste gas flow is cooled in the heat exchanger 6 so that the vaporous contaminants solidify in the form of small dust particles. If the heat exchanger which thus acts as a cooler is sufficiently long, the now dust-shaped particles of contaminants settle on the walls of the heat exchanger.

The condensing dust particles usually carry along any dust particles which orginally are entrained in the waste gas flow to cause their deposition on the heat exchanger walls. It will be noted that in the embodiment of FIG. 1, no extraneous carrier gas is added to the waste gas flow so that the quantity of waste gas flow exiting through pipe 5 is primarily dependent on the amount of gas originally introduced into the melt. If, for example, the illustrated embodiment refers to the gas treatment of an aluminum melt with chlorine, then the waste gas exiting through line 5 will exclusively or substantially exclusively consist of vaporous aluminum chloride which will quantitatively deposit on the walls of the heat exchanger 6.

Thus, no gas will exit from the heat exchanger. From a practical point of view any aluminum oxide which may be carried along by the aluminum chloride-comprising gas flow is also deposited on the heat exchanger walls. Therefore, in the event that the waste gas flow substantially exclusively consists of aluminum chloride, the heat exchanger 6 may be closed at its exit side. If this is done, then upon condensation of the aluminum chloride in the heat exchanger, subatmospheric pressure conditions will be created which in turn facilitate the withdrawal of the aluminum chloride waste gas from the molten metal surface. Further, the employment of a heat exchanger 6 with a closed exit zone prevents the deposition of any solid matter in the conduit 5 as, due to the vacuum conditions within the space of the heat exchanger 6, the gas speed within conduit 5 will be relatively high.

The embodiment illustrated in FIG. 1 has, however, the drawback that the entire amount of the vaporous contaminants and the dust particles originally entrained in the waste gas flow are deposited on the walls of the heat exchanger so that the latter has to be frequently cleaned in order to maintain a sufficient efficiency.

The embodiment illustrated in FIG. 2 overcomes this drawback. It will be noted that the arrangement illustrated is generally similar to the one of FIG. 1, but carrier gas is supplied to the gas inlet pipe 4 through conduit 7. Further, behind the heat exchanger or cooler 6, there is arranged a filtering means 8. By admixing the original gas mixture with predetermined quantities of carrier gas through line 7, the gas velocity of the waste gas flow exiting through pipe 5 will be considerable in the heat exchanger 6 so that the dust particles which condense within the heater 6 and those which originally were entrained in the gas flow are not deposited on the heat exchanger walls but are carried along by the waste gas flow exiting from the heat exchanger 6 and are mechanically separated in the filtering device 8. Thus, the dust particles are maintained in suspension within the gas flow until the gas reaches the separating means 8. The filtering device may have any suitable construction and may, for example, comprise an ordinary filter cloth separator.

It will be noted that in the embodiment of FIG. 2, the carrier gas is admixed with the original gas before it is supplied to the melt so that the carrier gas is also heated and thus has no cooling action on the waste gas flow. By contrast, in the embodiment of FIG. 3, which otherwise corresponds to the embodiment of FIG. 2, the carrier gas is added to the waste gas flow emanating from the melt and in this connection it will be noted that the carrier gas inlet pipe 7 communicates with the exit pipe 5. In this embodiment, therefore, the carrier gas has a cooling action which facilitates the condensation of the contaminants into solid form. In fact, if the amount of carrier gas introduced into line 5 is sufficient to cool the waste gas to below the condensation point of the vaporous contaminants, then heater 6 may be completely eliminated. However, in such an instance and in order to be able efficiently to withdraw the gases from the space above the melt 2, the carrier gas should be introduced into pipe 5 by an injector as will be more fully explained in connection with FIGS. 13, 14 and 15.

FIG. 4 shows an embodiment wherein carrier gas is also added to the waste gas flow after its discharge from the melt. The heat exchanger or cooler 6 as illustrated in FIGS. 1, 2 and 3 and the filter 8 of FIGS. 2 and 3 have, however, been replaced by a scrubber 9 which is operated with a wash liquid which, for example, is supplied to the scrubber by means of a spraying nozzle 10. The waste gas flow thus enters through conduit 5 the bottom region of the scrubber 9 and flows in countercurrent to the wash liquid. As the wash liquid will thus be contaminated by toxic or chemically corrosive substances, it is advisable not directly to discharge the wash liquid but to recycle the wash liquid as indicated by line 101. It will be noted that line 101 passes through a cleaning device 11 in which the undesired contaminants may be removed in any manner known, per se. Cleaning device 11 may also act as an auxiliary cooling means.

FIG. 5 illustrates an embodiment similar to the one of FIG. 4 wherein, however, in addition a filtering device 8 is arranged behind the scrubber 9. The additional provision of the filter 8 facilitates the removal of fine dust particles which precipitate during the contact between the wash liquid in the scrubber and the rising waste gas flow.

It will be noted that the embodiment of FIG. 5 also includes a cleaning installation 11 enabling the recycling of the scrubber liquid.

According to the embodiment of FIG. 6 a cooler or heat exchanger 6 is interpositioned between line 5 and the scrubber 9. This has the advantage that a certain amount of solid contaminants will already be removed in the heat exchanger 6 and moreover, the temperature of the waste gases entering the scrubber will be lower which, of course, facilitates operation.

According to the embodiment of FIG. 7, a filtering device 8 is provided in addition to the heat exchanger 6, both the filter 8 and the heater 6 being arranged before the waste gas flow reaches the scrubber 9.

According to the arrangement of FIG. 7, practically no solid contaminants will be formed in the scrubber as these are effectively deposited in the heat exchanger 6 and the filter 8. The scrubber 9 therefore primarily serves the purpose of removing gaseous contaminants from the waste gas.

This is particularly important if the waste gas flow contains gaseous contaminants which do not condense upon cooling but which are capable of removal by contact with a wash liquid. For example, if the waste gas flow contains free chlorine, the chlorine does not settle out in solid form but will be absorbed by the scrubber liquid.

FIG. 8 illustrates an embodiment wherein a gas flow advancing means 12 is interpositioned between the reaction vessel 1 and the cooler or heat exchanger 6. In the embodiment shown, the gas flow advancing means is a rotating fan or blower. It will be noted that carrier gas is introduced into exit line 5 through conduit 7 so that the gas flow accelerated by the fan 12 will comprise both the carrier gas and the waste gas flow.

In the embodiment according to FIG. 9, the flow advancing means 12 is arranged behind the heat exchanger 6. This construction has the advantage that the waste gas emanating from the heat exchanger 6 is rapidly withdrawn therefrom which, under certain circumstances, may result in improved heat exchange.

According to the embodiment of FIG. 10, a filtering device 8 is interpositioned between the heat exchanger 6 and the fan or blower 12. In this manner, solid particles are effectively removed from the waste gas flow before it reaches the flow advancing means 12.

FIG. 11 again illustrates an embodiment wherein a heat exchanger, a separating or filtering means 8 and a scrubber 9 are arranged in series while the flow advancing means 12 is connected in the line above the scrubber 9. It will be realized, of course, that several flow advancing means may be arranged at different locations of the system.

Figure 12:
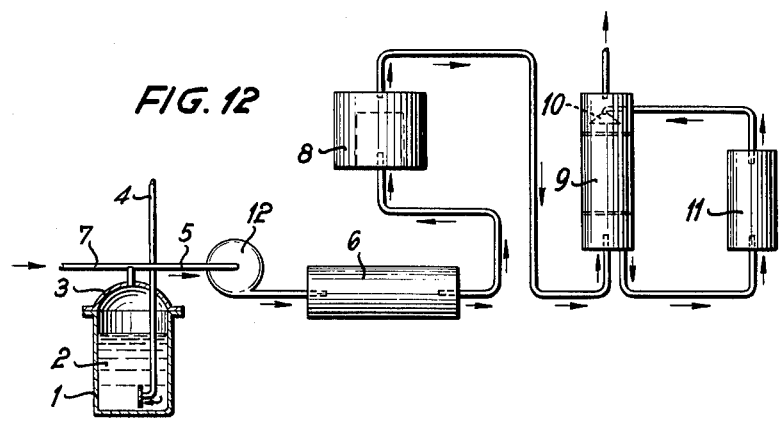

As shown in FIG. 12, the gas flow advancing means 12 is arranged between the heat exchanger 6 and the reaction vessel 1 while the filter device 8 and the scrubber 9 including a recycling and purification arrangement are mounted thereafter.

Figure 13:
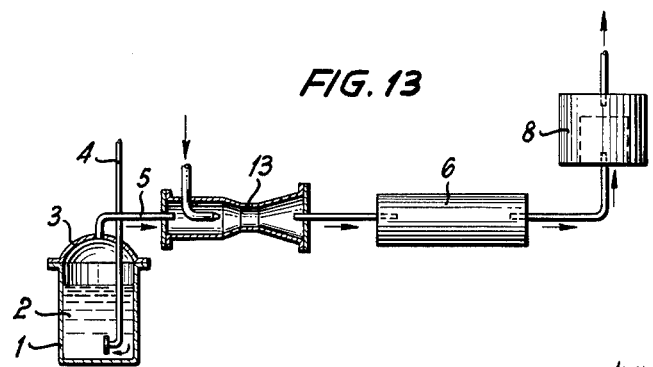

While the embodiments of FIGS. 8–12 illustrate gas flow advancing means in the form of blowers or fans, the embodiments of FIGS. 13–17 are concerned with gas advancing means in the form of injectors. Thus, the injector 13 of FIG. 13 is arranged in the line 5 between the reaction vessel 1 and the heat exchanger 6. The injector is operated with carrier gas. The carrier gas preferably should be pre-dried in order to prevent introduction of moisture into the system.

As the gas flowing through the injector is, of course, considerably cooled due to the expansion which takes place when the gas passes through the injector, it is advantageous to arrange the injector as close as possible to the hot reaction vessel 1. Therefore, in the embodiment according to FIG. 14, the injector, which is also operated by a carrier gas supplied through the inlet line 7, forms part of reaction vessel 1 and is, in fact, an integral constitutent of the cover 3 thereof. Thus, in the embodiment of FIG. 14, the injector is part of a dome-shaped portion 14 of the cover.

FIG. 15 shows an embodiment wherein the injector is operated by a large amount of carrier gas so that the waste gas flow drawn from the metal bath surface is cooled to such an extent by the injected carrier gas that any cooler or heat exchanger may be omitted. The cooled gases carrying the condensed dust particles are therefore directly supplied to the filtering device 8 where the dust particles are separated from the gas flow.

In the embodiment of FIG. 16, the injector is operated by gas or water and is arranged behind the heat exchanger 6 and filter 8. In this embodiment, the carrier gas need, of course, not be pre-dried as at the point of admixture the solid dust particles have already been separated from the waste gas flow.

If the injector 13 is operated with water or another liquid as optionally indicated in FIG. 16, the heat exchanger 6 and the filter device 8 may in many cases be omitted because the water generally cools the waste gas flow to a sufficient extent to cause the condensation of the contaminants and mechanical separation of the solid particles.

Therefore, as illustrated in the embodiment of FIG. 17, merely a water operated injector 13 is provided while the cooler and filtering device are omitted. However, as the water exiting from the injector 13 will be contaminated with toxic and/or corrosive substances, the water, after it has passed the separator 15 for separating gases which have not been dissolved in the water, is passed through a purification device 11 wherein undesired contaminants in the water are removed. Thereafter, the thus purified water may again be recycled to the injector 13 as indicated. The purification device 11 may also serve additional cooling purposes.

In employing a water operated injector which is arranged close to the reaction vessel 1, care should be taken to prevent that upon failure of the water pressure, water which is present in the injector flows back into the reactor 1.

FIGS. 18 and 19 illustrate diagrammatically two different types of heat exchangers which are suitable for use in the inventive system. In both types, the heat exchanger is predominantly formed by pipes whose external surfaces constitute the heat exchanging surfaces.

In the embodiment of FIG. 18, the pipes 16 extend in a horizontal direction and may be cleaned from the outside by means of rods 18 on which are mounted brushes 17. By inserting the brush rods 17, 18 into the heat exchanger, the brushes remove solid material adhering to the pipe walls and the dust particles will fall into the receptacles or pockets 19 from which they may be discharged by opening the cover 20.

In the embodiment according to FIG. 19, by contrast, the pipes 16 extend in vertical position. The entire heat exchanger is resiliently suspended with the aid of springs 21 and may be vibrated by means of a vibrating or shaking device schematically indicated by reference numerals 22. The solid particles adhering to the pipes 16, upon vibrating the heat exchanger, thus collect in the pocket 19 and may be discharged from there by opening the lid 20.

Of course, also in this embodiment, it is feasible to arrange scraping or brushing means which are inserted from the outside.

In the embodiment of FIG. 20, the heat exchanging surfaces are formed by a casing 23 and by a cooled drum 24 arranged in the space defined by the casing 23. Solid material which collects on the inner walls of the casing 23 and on the external surface of the drum 24 is continuously removed by a rotating scraping device 26 and is conveyed into the pocket 19. Reference numerals 25 indicate the axes about which the scraping device 26 rotates.

While specific embodiments of my invention have been shown and described in detail to illustrate the application of the inventive principles, it will be understood that my invention may be embodied otherwise without departing from such principles.

What is claimed is:

1. A method of separating gaseous and vaporous contaminants from waste gases rising from a metallic melt which has been treated with chlorine in a furnace having a waste gas discharge line, which comprises introducing into said waste gas discharge line a rapidly flowing stream of dry pressurized extraneous carrier gas to suck waste gas from said furnace into said discharge line thereby to speed up the flow of waste gas through said discharge line and to obtain a mixture of carrier gas and waste gas, passing the mixture thereafter through a confined cooling zone to cause precipitation of said gaseous and vaporous contaminants in said waste gas into solid particles, maintaining the precipitated solid particles in suspension in said gas mixture and conveying the gas mixture with the precipitated particles suspended therein to a filter station for removal of said particles.

2. A method as claimed in claim 1, wherein said waste gas line has an injector portion, said carrier gas being passed through said injector portion to increase its flow velocity through said waste gas discharge line.

3. A method as claimed in claim 1, wherein said carrier gas is positively forced through said waste gas discharge line.

References Cited by the Examiner

UNITED STATES PATENTS

| | | | |
|---|---|---|---|
| 1,898,637 | 2/1933 | Lorraine | 55—468 X |
| 2,533,021 | 12/1950 | Krchma | 55—72 X |
| 2,580,635 | 1/1952 | Winter | 55—72 X |
| 2,675,891 | 4/1954 | Frey | 55—72 X |
| 2,811,435 | 10/1957 | Bannister et al. | 75—60 X |
| 2,870,869 | 1/1959 | Mahler | 55—71 X |
| 2,940,541 | 6/1960 | Plant | 55—71 |
| 3,009,687 | 11/1961 | Hendricks | 261—118 X |
| 3,063,686 | 11/1962 | Irwin | 261—118 |
| 3,084,039 | 4/1963 | Baum | 75—59 |

REUBEN FRIEDMAN, *Primary Examiner.*

GEORGE D. MITCHELL, *Examiner.*

B. NOZICK, *Assistant Examiner.*